United States Patent
Zhang et al.

(10) Patent No.: US 11,314,805 B2
(45) Date of Patent: Apr. 26, 2022

(54) METHOD AND APPARATUS FOR RETRIEVING AUDIO FILE, SERVER, AND COMPUTER-READABLE STORAGE MEDIUM

(71) Applicant: TENCENT TECHNOLOGY (SHENZHEN) COMPANY LIMITED, Shenzhen (CN)

(72) Inventors: Jingyun Zhang, Shenzhen (CN); Hui Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 105 days.

(21) Appl. No.: 16/858,493

(22) Filed: Apr. 24, 2020

(65) Prior Publication Data
US 2020/0257722 A1     Aug. 13, 2020

(30) Foreign Application Priority Data
Nov. 22, 2017 (CN) .......................... 201711173138.1

(51) Int. Cl.
    *G06F 17/00*     (2019.01)
    *G06F 16/632*     (2019.01)
    *G06F 16/68*     (2019.01)

(52) U.S. Cl.
    CPC .......... *G06F 16/634* (2019.01); *G06F 16/686* (2019.01)

(58) Field of Classification Search
    CPC .............................. G06F 16/634; G06F 16/686
(Continued)

(56) References Cited

U.S. PATENT DOCUMENTS

2009/0324199 A1* 12/2009 Haitsma ................. H04H 60/59
    386/241
2010/0306193 A1* 12/2010 Pereira .................. G06F 16/783
    707/728
(Continued)

FOREIGN PATENT DOCUMENTS

| CN | 101364222 A | 2/2009 |
|---|---|---|
| CN | 103854646 A | 6/2014 |

(Continued)

OTHER PUBLICATIONS

The World Intellectual Property Organization (WIPO) International Search Report for PCT/CN2018/114889 dated Feb. 2, 2019 6 Pages (including translation).

*Primary Examiner* — Paul C McCord
(74) *Attorney, Agent, or Firm* — Anova Law Group, PLLC

(57) ABSTRACT

A method for retrieving an audio file includes: collecting an audio segment in real time; and for every two chronologically adjacent audio frames in a plurality of audio frames of the audio segment, acquiring a difference value between spectral centroids of a sub-band corresponding to the two audio frames, to obtain a plurality of difference values; and obtaining an audio fingerprint corresponding to the two audio frames based on the plurality of difference values. A quantity of the plurality of difference values equaling a quantity of sub-bands of one of the two audio frames. Each bit of the audio fingerprint being determined based on a comparison between a difference value corresponding to the bit and a preset difference value threshold. The method also includes retrieving, in an audio file library based on audio fingerprints of the plurality of audio frames, a target audio file matching the audio segment.

18 Claims, 8 Drawing Sheets

(58) Field of Classification Search
USPC .......................................................... 700/94
See application file for complete search history.

(56) References Cited

U.S. PATENT DOCUMENTS

| | | | |
|---|---|---|---|
| 2012/0113270 A1* | 5/2012 | Spracklen | H04R 27/00 |
| | | | 348/194 |
| 2014/0016789 A1* | 1/2014 | Lee | G10L 19/018 |
| | | | 381/56 |
| 2014/0277640 A1* | 9/2014 | Bilobrov | G10L 25/54 |
| | | | 700/94 |
| 2018/0047416 A1* | 2/2018 | Bilobrov | G06F 16/683 |
| 2018/0285455 A1* | 10/2018 | DiMaria | G06F 16/683 |
| 2020/0265864 A1* | 8/2020 | Markovic | G10L 25/21 |

FOREIGN PATENT DOCUMENTS

| | | |
|---|---|---|
| CN | 104091599 A | 10/2014 |
| CN | 104464726 A | 3/2015 |
| CN | 107918663 A | 4/2018 |

\* cited by examiner

Quantity of fingerprint difference bits of a noise-free voice and a noise-added voice before voice activity detection improvement Quantity of fingerprint difference bits of a noise-free voice and a noise-added voice after voice activity detection improvement Decrease degrees of precision rates of data of different transformation in a baseline system and an improvement system Decrease degrees of recall rates of data of different transformation in a baseline system and an improvement system

METHOD AND APPARATUS FOR RETRIEVING AUDIO FILE, SERVER, AND COMPUTER-READABLE STORAGE MEDIUM

CROSS REFERENCES TO RELATED APPLICATIONS

This application is a continuation application of PCT Patent Application No. PCT/CN2018/114889, filed on Nov. 9, 2018, which claims priority to Chinese Patent Application No. 201711173138.1, entitled "METHOD AND APPARATUS FOR RETRIEVING AUDIO FILE" filed on Nov. 22, 2017, both which are incorporated by reference in their entirety.

FIELD OF THE TECHNOLOGY

This application relates to the field of audio processing, and in particular, to a method and an apparatus for retrieving an audio file, a server, and a computer-readable storage medium.

BACKGROUND OF THE DISCLOSURE

With a rapid increase in a quantity of audio files in a network, a requirement for retrieving a large quantity of audio files is more urgent. In various actual application scenarios, an audio segment is usually acquired. In this case, how to retrieve a target audio file matching the audio segment from an audio file library storing massive audio files has become a major concern in the industry.

SUMMARY

Embodiments of this application provide a method and an apparatus for retrieving an audio file, a server, and a computer-readable storage medium, which can resolve a problem that accuracy of extracting an audio fingerprint is poor in the related art. The technical solutions are as follows:

According to one aspect, a method for retrieving an audio file is provided, applied to a server. The method includes: collecting an audio segment in real time; and for every two chronologically adjacent audio frames in a plurality of audio frames of the audio segment, acquiring a difference value between spectral centroids of a sub-band corresponding to the two audio frames, to obtain a plurality of difference values; and obtaining an audio fingerprint corresponding to the two audio frames based on the plurality of difference values. A quantity of the plurality of difference values equaling a quantity of sub-bands of one of the two audio frames. Each bit of the audio fingerprint being determined based on a comparison between a difference value corresponding to the bit and a preset difference value threshold. The method also includes retrieving, in an audio file library based on audio fingerprints of the plurality of audio frames, a target audio file matching the audio segment.

According to another aspect, a server is provided, including a processor and a memory. The processor is configured to: collect an audio segment in real time; and for every two chronologically adjacent audio frames in a plurality of audio frames of the audio segment, acquire a difference value between spectral centroids of a sub-band corresponding to the two audio frames, to obtain a plurality of difference values; and obtain an audio fingerprint corresponding to the two audio frames based on the plurality of difference values. A quantity of the plurality of difference values equaling a quantity of sub-bands of one of the two audio frames. Each bit of the audio fingerprint being determined based on a comparison between a difference value corresponding to the bit and a preset difference value threshold. The processor is also configured to retrieve, in an audio file library based on audio fingerprints of the plurality of audio frames, a target audio file matching the audio segment.

According to another aspect, a non-transitory computer-readable storage medium is provided, the storage medium storing at least one instruction, and the instruction being loaded and executed by a processor to implement: collecting an audio segment in real time; and for every two chronologically adjacent audio frames in a plurality of audio frames of the audio segment, acquiring a difference value between spectral centroids of a sub-band corresponding to the two audio frames, to obtain a plurality of difference values; and obtaining an audio fingerprint corresponding to the two audio frames based on the plurality of difference values. A quantity of the plurality of difference values equaling a quantity of sub-bands of one of the two audio frames. Each bit of the audio fingerprint being determined based on a comparison between a difference value corresponding to the bit and a preset difference value threshold. The instruction also cause the processor to implement: retrieving, in an audio file library based on audio fingerprints of the plurality of audio frames, a target audio file matching the audio segment.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and persons of ordinary skill in the art may still derive other accompanying drawings from these accompanying drawings without creative efforts.

DESCRIPTION OF EMBODIMENTS

Figure 1:
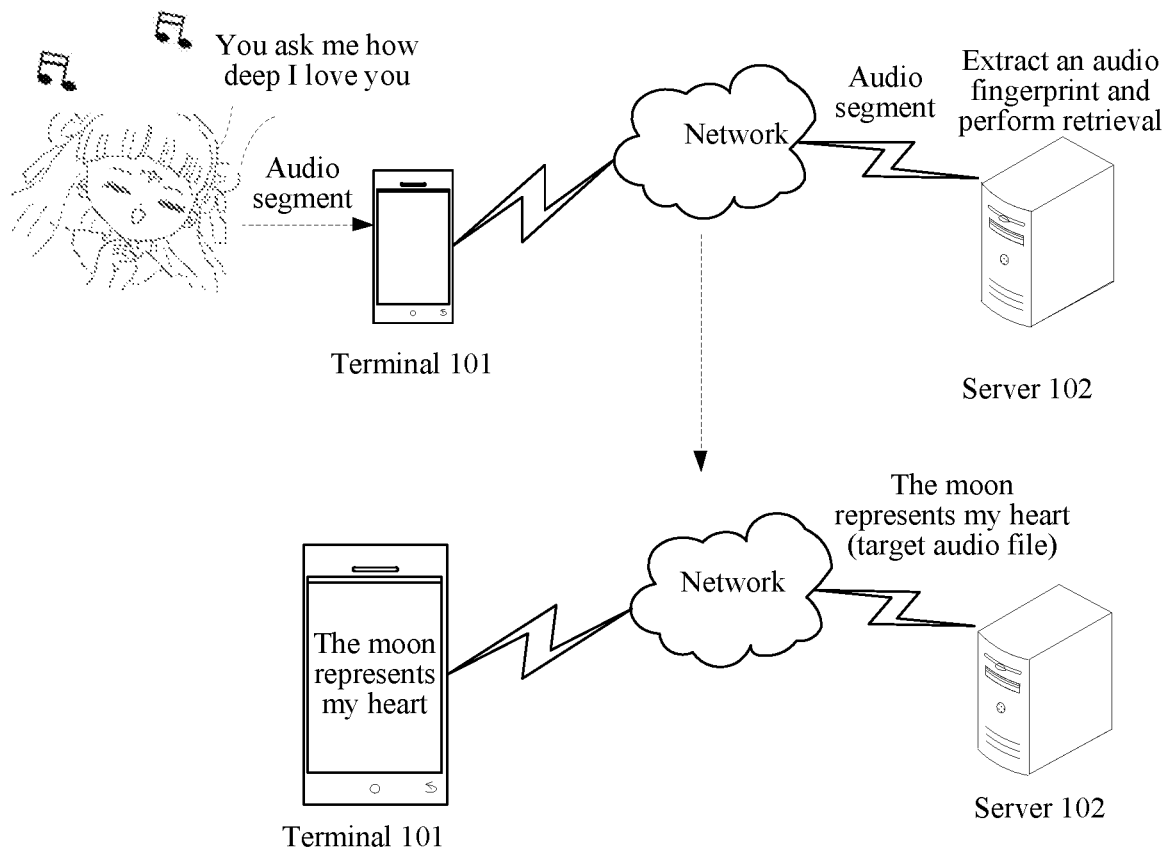
FIG. 1 is a schematic diagram of an implementation environment of a method for retrieving an audio file according to an embodiment of this application.

The following clearly and completely describes the technical solutions in the embodiments of this application with reference to the accompanying drawings in the embodiments of this application. Apparently, the described embodiments are some embodiments of this application rather than all of the embodiments. All other embodiments obtained by persons of ordinary skill in the art based on the embodiments of this application without creative efforts shall fall within the protection scope of this application.

For convenience of understanding, terms related to the embodiments of this application are explained.

Audio frame: a segment of audio obtained by dividing an audio segment in time domain according to preset duration.

Pseudo formant problem: a problem that two overlapping non-formants in a spectrum are recognized as formants by mistake.

Time domain misalignment: a case in which an offset exists between audio fingerprints of an audio segment and audio fingerprints of an audio file stored in an audio file library in time domain.

Frame overlapping ratio: a parameter in a framing process, which refers to a ratio of overlapping duration between two adjacent audio frames in time domain to duration of an audio frame. A Philips algorithm requires adoption of a large frame overlapping ratio, for example, a frame overlapping ratio of 31/32, while the method provided in the embodiments of this application may adopt a small frame overlapping ratio, for example, a frame overlapping ratio of 1/2.

Frame shift: a time difference between a start time point of a next audio frame and a start time point of a previous audio frame. A larger frame overlapping ratio indicates a smaller frame shift. For example, assuming that an audio frame is represented by Ts and the frame overlapping ratio is 31/32, the frame shift is 1/32×Ts.

Recall rate: a ratio of a quantity of target audio files retrieved from an audio file library to a total quantity of audio files in the audio file library.

Precision rate: a ratio of a quantity of correct target audio files retrieved from an audio file library to a quantity of target audio files retrieved from the audio file library.

In some embodiments, an audio file is retrieved based on a Philips algorithm as follows: Windowing and framing are performed on an audio segment according to a certain frame overlapping ratio; after a plurality of audio frames are obtained, fast Fourier transformation (FFT) is performed on each audio frame, to obtain a spectrum of each audio frame; each audio frame is divided into 33 sub-bands in frequency domain; and energy of each sub-band is computed based on the spectrum of the audio frame. After that, for each audio frame, an energy difference between any two adjacent sub-bands of the audio frame is computed, to obtain 32 energy differences of the audio frame. For every two chronologically adjacent audio frames in the plurality of audio frames, a difference value between each energy difference corresponding to a previous audio frame and each energy difference corresponding to a next audio frame is computed, to obtain 32 difference values. For each of the 32 difference values, a bit corresponding to the difference value takes a value of 1 when the difference value is greater than 0, and a bit corresponding to the difference value takes a value of 0 when the difference value is less than 0, to obtain a 32-bit audio fingerprint. Then, retrieval is performed in the audio file library based on the audio fingerprint, to obtain a target audio file.

FIG. 1 is a schematic diagram of an implementation environment of a method for retrieving an audio file according to an embodiment of this application. The implementation environment includes a plurality of terminals 101, and a plurality of servers 102. The plurality of terminals 101 are connected to the plurality of servers 102 through a wireless or wired network. The plurality of terminals 101 may be computers, smartphones, tablets, or other servers. Each server 102 may be one server, or a server cluster including a plurality of servers, or a cloud computing service center.

In a process of retrieving an audio file, a terminal 101 may provide an audio segment to a server 102, and the server 102 may obtain a target audio file matching the audio segment based on the audio segment and an audio file library. Optionally, the server 102 may further include at least one type of database, for example, a pop music database, a light music database, or an animation music database. The at least one type of database is used for storing one or more types of audio files.

The method for retrieving an audio file according to this embodiment of this application may be applied to various application scenarios, for example, may be applied to a humming retrieval scenario. In a scenario in which a user searches for music, the user usually forgets the name of the music. Consequently, the user cannot find the desired music. By adopting the method provided in this embodiment of this application, the user may directly hum the music. A terminal may collect a voice segment uttered by the user as an audio segment to be provided to a server. The server may extract audio fingerprints from the audio segment, retrieve a target audio file in an audio file library based on the audio fingerprints, and return the target audio file to the terminal. The terminal may provide the target audio file or the name of the target audio file to the user, helping the user to find the desired music. For example, as shown in FIG. 1, a user hums "you ask me how deep I love you" to the terminal 101. The terminal may collect an audio segment, and provide the audio segment to the server 102. The server 102 retrieves a target audio file, which is "the moon represents my heart", matching the audio segment, and returns the target audio file to the terminal 101.

In the foregoing scenario, a pseudo formant problem in a fingerprint extraction process is avoided in this embodiment of this application, so that accuracy of audio fingerprints can be improved. The server may retrieve an audio file required by a user more accurately, and help the user to find desired music.

Figure 2:
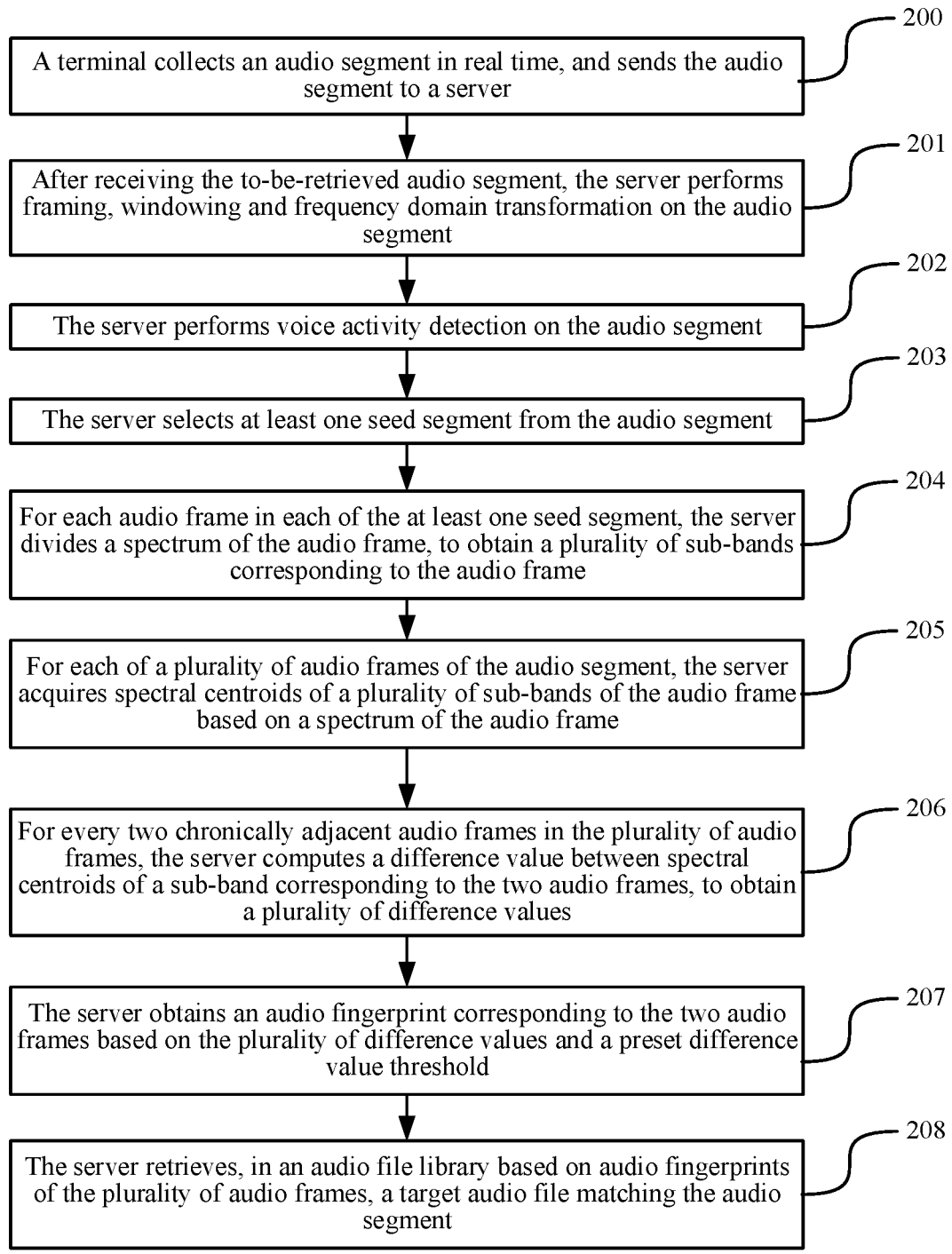
FIG. 2 is a flowchart of a method for retrieving an audio file according to an embodiment of this application.

FIG. 2 is a flowchart of a method for retrieving an audio file according to an embodiment of this application. Interaction bodies of this embodiment of the present disclosure are a terminal and a server. Referring to FIG. 2, the method includes:

200. A terminal collects an audio segment in real time, and transmits the audio segment to a server.

The collecting an audio segment in real time may be clipping an audio segment, or collecting an audio segment. The clipping an audio segment refers to clipping an audio segment from a whole acquired audio file. The collecting an audio segment refers to directly collecting an audio segment. The terminal may collect an audio segment, and transmit the collected audio segment to the server, to implement an effect that the server collects an audio segment in real time. For example, a music application client may be installed in the terminal, and the terminal may collect an audio segment in a client running process, and transmit the audio segment to the server. The server receives the audio segment. For example, a user may hum music to a microphone of the terminal. The terminal may collect, through the microphone, the music hummed by the user as an audio segment, and transmit the audio segment to the server.

The retrieving an audio file may be triggered by a terminal user by starting an audio search function on the terminal. For example, the user may start the audio search function on the music application client run by the terminal. In this case, the music application client may collect an audio segment by using the microphone of the terminal.

201. After receiving the to-be-retrieved audio segment, the server performs framing, windowing and frequency domain transformation on the audio segment.

A type of the audio segment may be pop music, classical music, folk music, animation music, light music, or the like. A format of the audio segment may be Moving Picture Experts Group Audio Layer III (MP3), Windows Media Audio (WMA), or the like. This is not limited in this embodiment of this application.

For a process of performing framing on the audio segment, the server may perform framing on the audio segment according to a preset frame overlapping ratio, to obtain a plurality of candidate audio frames. The preset frame overlapping ratio may be a relatively small frame overlapping ratio. The preset frame overlapping ratio is lower than a frame overlapping ratio required by a Philips algorithm, and may be 1/2. The preset frame overlapping ratio may be pre-configured by a developer on the server. Further, the server may further acquire a preset frame length and a preset sampling rate, and perform framing on the audio segment according to the preset frame overlapping ratio, the preset frame length, and the preset sampling rate. A frame length of each of the plurality of candidate audio frames obtained through the framing is the preset frame length, and a sampling rate of the plurality of candidate audio frames is the preset sampling rate. The preset frame length and the preset sampling rate may also be determined according to an actual requirement, and may be pre-configured by a developer on the server. For example, the preset frame length is 20 ms, and the preset sampling rate is 8 kHz.

For a process of performing windowing on the plurality of candidate audio frames obtained after the framing, the server may perform windowing on each candidate audio frame by using a Hanning window, to achieve a technical effect of improving accuracy of audio fingerprints. In the related art, a Hamming window is usually used for performing windowing. However, in this embodiment of this application, a Hanning window is used as a window function. A side-lobe attenuation speed of the Hanning window is higher, so that a side-lobe effect can be reduced and interference of a side-lobe of the window function to an audio fingerprint extraction process is avoided while ensuring that a truncation effect in a framing process can be reduced, thereby improving the accuracy of the audio fingerprints.

For a process of performing frequency domain transformation on the audio segment, FFT may be performed on each candidate audio frame, to obtain a spectrum of each candidate audio frame. Certainly, a transformation algorithm other than the FFT may be further adopted when spectrum transformation is performed.

202. The server performs voice activity detection on the audio segment.

The voice activity detection (VAD) refers to a process of acquiring a portion that belongs to a voice in all audio frames of the audio segment. In step 201, the plurality of candidate audio frames obtained from the audio segment may belong to a voice portion, a mute portion, or a noise portion of the audio segment. Candidate audio frames of the mute portion are useless for the audio fingerprint extraction process, and may consume a computing amount of the audio fingerprint extraction process. Candidate audio frames of the noise portion cannot reflect an actual audio feature of the audio segment, and may interfere with the audio fingerprint extraction process. Therefore, in this embodiment of this application, the VAD may be performed on the audio segment. That is, candidate audio frames of the voice portion are obtained from all the candidate audio frames of the audio segment through screening. Audio fingerprints are extracted based on the candidate audio frames of the voice portion, so as to reduce a computing amount of extracting audio fingerprints, and simultaneously ensure accuracy of the extracted audio fingerprints.

A specific process of the VAD may include the following step 1 to step 3:

Step 1. For each of a plurality of candidate audio frames of the audio segment, acquire an energy zero-crossing rate of the candidate audio frame based on a spectrum of the candidate audio frame.

The energy zero-crossing rate refers to a quantity of times that a waveform of a candidate audio frame crosses a zero level per second. The energy zero-crossing rate can reflect frequency information of the candidate audio frame. During an implementation, for each candidate audio frame, short-time energy of the candidate audio frame may be computed, and an energy zero-crossing rate of each candidate audio frame is computed based on the short-time energy and a step function.

Step 2. Acquire energy ratios of a plurality of sub-bands of the candidate audio frame based on the spectrum of the candidate audio frame.

This step may include the following (1) and (2).

(1) For each candidate audio frame, the candidate audio frame is divided into a plurality of sub-bands in frequency domain. For example, the candidate audio frame may be uniformly divided into 4 sub-bands.

(2) For each of the plurality of sub-bands, an energy ratio of the sub-band is obtained through computing according to the following formula.

$$SBER_i = \frac{\int_{L_i}^{U_i} |X(\omega)^2 d\omega|}{\int_0^{\omega_0} X(\omega)^2 d\omega},$$

where i represents an identifier of a sub-band of the candidate audio frame, $SBER_i$ represents an energy ratio of the sub-band i, $X(\omega)$ represents an amplitude of a frequency $\omega$, $U_i$ represents an upper limit frequency of the sub-band i, and $L_i$ represents a lower limit frequency of the sub-band i.

Step 3. Obtain, through screening, the plurality of audio frames that do not meet a preset energy condition from the plurality of candidate audio frames based on the energy zero-crossing rate and the energy ratios of each candidate audio frame. The preset energy condition includes the energy zero-crossing rate is lower than a preset zero-crossing rate threshold, and similarities between the energy ratios of the plurality of sub-bands meet a requirement. The preset energy condition is used for indicating that a corresponding candidate audio frame is the mute portion or the noise portion.

To make distinct descriptions, candidate audio frames that do not meet the preset energy condition, that is, candidate audio frames belonging to the voice portion, are referred to as audio frames herein. In a specific process of obtaining, through screening, a plurality of audio frames, for each of the plurality of candidate audio frames, the server may determine whether an energy zero-crossing rate of the candidate audio frame is lower than a preset zero-crossing rate threshold, and simultaneously determine whether similarities between the energy ratios of the plurality of sub-bands meet a requirement. When the energy zero-crossing rate of the candidate audio frame is lower than the preset zero-crossing rate threshold, and the similarities between the energy ratios of the plurality of sub-bands meet the requirement, it indicates that the candidate audio frame belongs to the mute portion or the noise portion, and no audio fingerprint is extracted based on the candidate audio frame. When the energy zero-crossing rate of the candidate audio frame is not lower than the preset zero-crossing rate threshold, or the similarities between the energy ratios of the plurality of sub-bands do not meet the requirement, it indicates that the candidate audio frame belongs to the voice portion, and the candidate audio frame is obtained through screening. Therefore, the subsequent process can continue based on the candidate audio frame of the voice portion.

For a specific process of determining whether similarities between the energy ratios of the plurality of sub-bands meet a requirement, a similarity threshold may be set. Similarities between a plurality of energy ratios are computed. When the similarities between the plurality of energy ratios are less than the similarity threshold, it is determined that the energy ratios of the plurality of sub-bands are approximately equal, that is, the similarities meet the requirement.

Through the foregoing step 1 to step 3, a plurality of audio frames belonging to the voice portion in the audio segment are obtained, and the following technical effect may be achieved.

First, the audio frames have the mute portion removed, so that meaningless consumption of a computing amount can be avoided when audio fingerprints are extracted based on the audio frames.

Second, the audio frames have the noise portion removed, so that accuracy of audio fingerprints can be ensured when the audio fingerprints are extracted based on the audio frames, improving a recall rate and a precision rate in a retrieval process.

Third, noise immunity is improved. In the related art, the mute portion and the voice portion are distinguished usually based on short-time energy and a zero-crossing rate, thereby performing the VAD. Because a zero-crossing rate of a voiced portion is equivalent to that of the noise portion, a VAD process may confuse the voiced portion with the noise portion. When a signal-to-noise ratio is not high, accuracy is poor. Therefore, this embodiment of this application makes an improvement, and combines a feature of a sub-band energy ratio in the VAD process. An experiment proves that, a case that accuracy is poor when a signal-to-noise ratio is not high may be alleviated, and noise immunity is improved.

Figure 3:
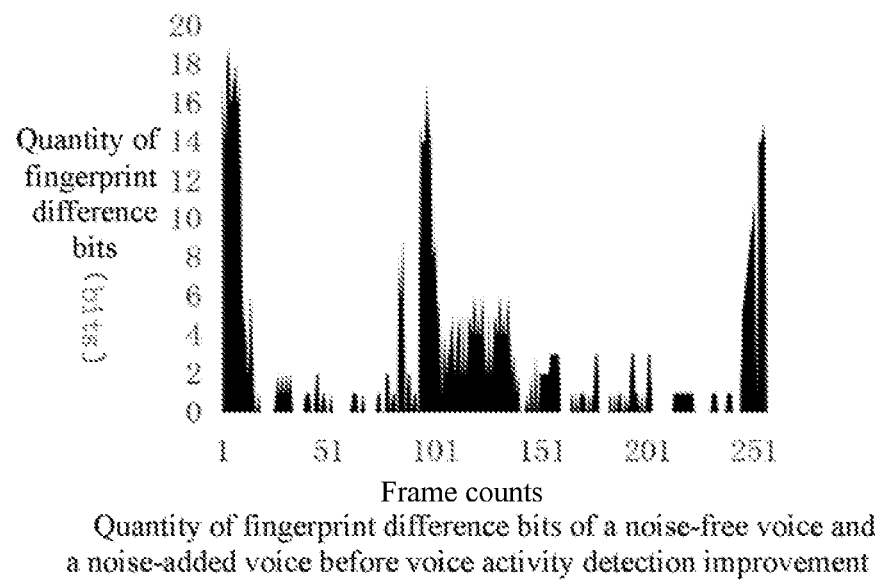
FIG. 3 is a schematic diagram of a quantity of difference bits between an audio fingerprint before adding a noise and an audio fingerprint after adding a noise in the related art.
Figure 4:
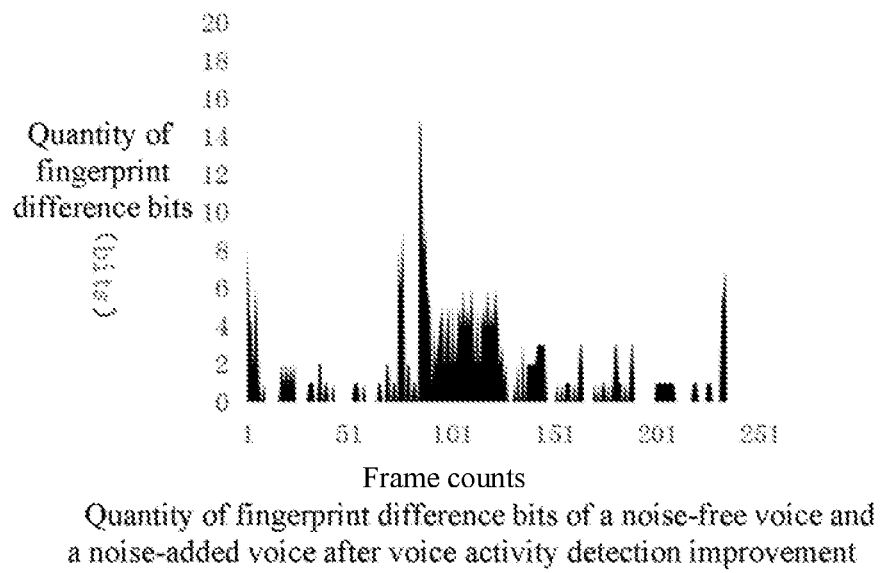
FIG. 4 is a schematic diagram of a quantity of difference bits between an audio fingerprint before adding a noise and an audio fingerprint after adding a noise in an embodiment of this application.

The applicant respectively performs a comparative experiment on a VAD method provided in the related art and a VAD method provided in this embodiment of this application. FIG. 3 is a schematic diagram of a quantity of difference bits between audio fingerprints of a noise-free audio segment and audio fingerprints of a noisy audio segment in the related art. FIG. 4 is a schematic diagram of a quantity of difference bits between audio fingerprints of a noise-free audio segment and audio fingerprints of a noisy audio segment in an embodiment of this application. It can be seen that, the audio fingerprints of the noise-free audio segment and the audio fingerprints of the noisy audio segment in the VAD method provided in this embodiment of this application are relatively close. Noise immunity performance is obviously improved in the VAD method provided in this embodiment of this application.

203. The server selects at least one seed segment from the audio segment, where each seed segment refers to at least one audio frame located in a preset quantity of frames around an energy peak.

The locating in a preset quantity of frames around an energy peak refers to locating in a preset quantity of frames around a frame corresponding to an energy peak.

A process of selecting a seed segment may include the following step 1 to step 2.

Step 1. The server may acquire at least one energy peak in the audio segment. The energy peak may refer to signal energy peak, such as a short-time energy peak.

Energy peaks of a spectrum refer to maximum value points of energy in the spectrum. The server may compute energy corresponding to each frequency in a spectrum of to-be-retrieved audio, to acquire at least one energy peak.

Step 2. Select at least one seed segment from the audio segment based on the at least one energy peak.

For each energy peak, an audio frame in a preset quantity of frames in the left of the energy peak and an audio frame in a preset quantity of frames in the right of the energy peak may be selected. That is, at least one audio frame near the energy peak is selected, and the audio frames are used as a seed segment corresponding to the energy peak. For example, assuming that a preset quantity of frames is 5, 5 audio frames may be selected from the energy peak to the left, and 5 audio frames are selected from the energy peak to the right. The 10 audio frames are used as one seed segment.

In this embodiment, at least one seed segment is selected from the audio segment, sub-band division is performed based on the seed segment, and audio fingerprints are extracted. The following technical effect may be achieved.

First, noise immunity in the audio fingerprint extraction process is improved.

Figure 5:
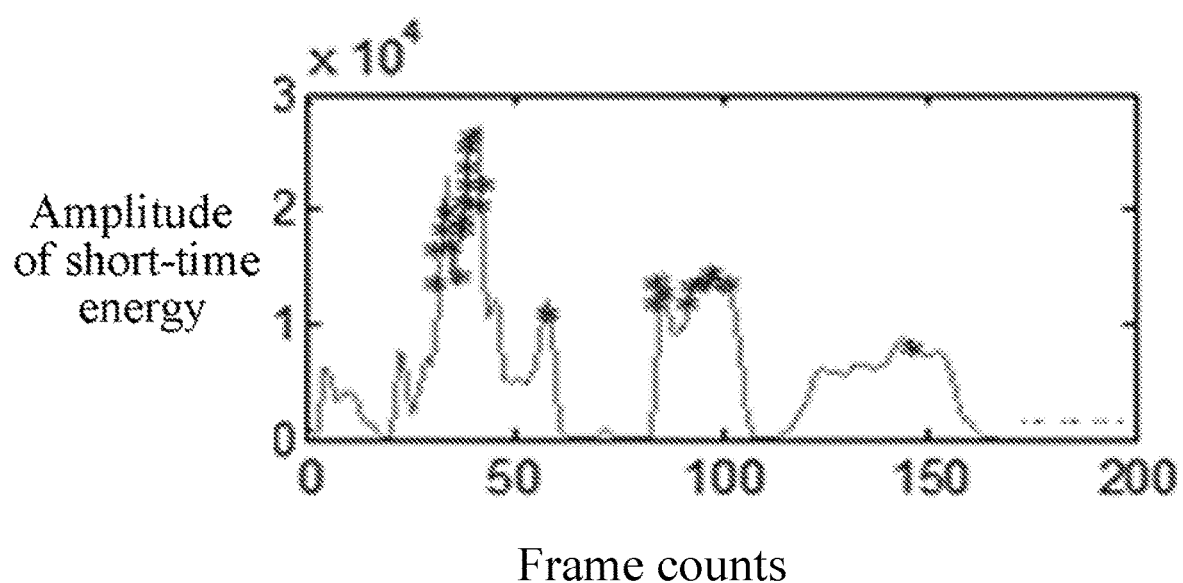
FIG. 5 is a schematic diagram of energy features of a sub-band before adding a noise and a sub-band after adding a noise according to an embodiment of this application.

The applicant performs a noise addition experiment on an audio segment, and compares sub-band energy features of the audio segment before noise addition with sub-band energy features of the audio segment after noise addition. It is found that for regions near energy peaks of the audio segment, sub-band energy features of the regions are approximately unchanged before and after the noise addition. For example, referring to FIG. 5, sub-bands whose sub-band energy features are substantially unchanged before and after the noise addition are marked by using *. It can be observed that, most points marked by using * are located near the energy peaks.

In combination with such an inventive idea, in this embodiment, at least one audio frame located in a preset quantity of frames around an energy peak is used as a seed segment corresponding to the energy peak. Audio fingerprints of a seed segment are substantially unchanged when a noise exists, which can enhance noise immunity and robustness of audio retrieval.

Second, a computing amount in the audio fingerprint extraction process is reduced.

In the related art, all the audio frames obtained after VAD are divided into sub-bands to extract audio fingerprints. In this embodiment, seed segments may be obtained through screening from all the audio frames, and only audio frames in the seed segments are divided into sub-bands to extract audio fingerprints, so that a quantity of audio frames in which audio fingerprints need to be extracted is reduced, thereby reducing the computing amount. Therefore, time consumed by retrieving an audio file is reduced and a speed of retrieving an audio file is improved.

204. For each audio frame in each of the at least one seed segment, the server divides a spectrum of the audio frame, to obtain a plurality of sub-bands corresponding to the audio frame.

Optionally, the server may divide the audio frame by using a Mel sub-band division method, to obtain a plurality of sub-bands of the audio frame. The Mel sub-band division method may be understood as that an audio frame passes through a group of Mel filters, and each Mel filter may obtain a sub-band through filtering, thereby obtaining a plurality of sub-bands. A formula of the Mel sub-band division method is specifically as follows:

$$D_{Mel} = 2.596 \times 10^3 lg\left(1 + \frac{F\max}{700}\right) M; \text{ and}$$

$$B_m = 700\left[\exp\left(m\frac{D_{mel}}{2.596 \times 10}\right) - 1\right],$$

where $F_{max}$ represents a maximum frequency of an audio frame, M represents a quantity of sub-bands, and a bandwidth range of an $m^{th}$ sub-band is $(B_{m-1}, B_m)$.

The following technical effect may be achieved by performing sub-band division by using the Mel sub-band division method: because a process of filtering audio by the Mel filter is close to an auditory characteristic of a human ear, use of the Mel sub-band division method can improve accuracy of retrieving an audio file, which is proved through the following experiment.

205. For each of a plurality of audio frames of the audio segment, the server acquires spectral centroids of a plurality of sub-bands of the audio frame based on a spectrum of the audio frame.

A process of computing a spectral centroid may specifically include the following step 1 to step 2.

Step 1. For each of the plurality of sub-bands, acquire an original spectral centroid of the sub-band based on an amplitude of each frequency in a spectrum of the sub-band.

For each of the plurality of sub-bands, an amplitude of each frequency of the sub-band may be computed according to the following formula, to obtain an original spectral centroid of the sub-band.

$$C_m = \frac{\int_{l_m}^{h_m} fP(f)df}{\int_{l_m}^{h_m} P(f)df},$$

where $C_m$ represents an original spectral centroid of a sub-band m, P(f) represents an amplitude of a frequency f, m represents an identifier of the sub-band, $h_m$ represents a lower limit frequency of the sub-band m, and $l_m$ represents an upper limit frequency of the sub-band m.

Step 2. Perform normalization on the original spectral centroid based on a lower limit frequency and an upper limit frequency of the sub-band, to obtain a spectral centroid of the sub-band of the audio frame.

For each of the plurality of sub-bands, after an original spectral centroid of the sub-band is computed, normalization may be performed on the original spectral centroid of the sub-band based on a lower limit frequency and an upper limit frequency of the sub-band according to the following formula, to obtain a spectral centroid of the sub-band.

$$NC_m = [C_m - (h_m + l_m)]/2(h_m - l_m),$$

where $NC_m$ represents a spectral centroid of the sub-band m.

A technical effect of a normalization process is that because value ranges of original spectral centroids of the sub-bands obtained in step 1 are different, and a value range of an original spectral centroid of a high frequency sub-band is higher than a value range of an original spectral centroid of a low frequency sub-band, it may be ensured, by performing normalization on the original spectral centroids, that value ranges of spectral centroids are not affected by selection of spectral sub-bands.

206. For every two chronologically adjacent audio frames in the plurality of audio frames, the server computes a difference value between spectral centroids of a sub-band corresponding to the two audio frames, to obtain a plurality of difference values. A quantity of the plurality of difference values equals a quantity of sub-bands of one of the two audio frames.

For every two chronologically adjacent audio frames, the server may compute a difference value between a spectral centroid of the first sub-band in a previous audio frame and a spectral centroid of the first sub-band in a next audio frame, and then compute a difference value between a spectral centroid of the second sub-band in the previous audio frame and a spectral centroid of the second sub-band in the next audio frame. The rest is deduced by analogy, until a difference value between a spectral centroid of the last sub-band in the previous audio frame and a spectral centroid of the last sub-band in the next audio frame is computed, to obtain a plurality of difference values corresponding to the two audio frames. A quantity of the plurality of difference values may be equal to a quantity of sub-bands obtained by dividing one audio frame.

207. The server obtains an audio fingerprint corresponding to the two audio frames based on the plurality of difference values and a preset difference value threshold, each bit of the audio fingerprint being determined by whether a difference value corresponding to the bit meets a preset difference value condition. The preset difference value condition is that a difference value is greater than the preset difference value threshold. In other words, each bit of the audio fingerprint may be determined based on a comparison between a difference value corresponding to the bit and a preset difference value threshold.

In this embodiment of this application, one audio fingerprint may be determined in every two chronologically adjacent audio frames, and each audio fingerprint is a string of binary digits. After the plurality of difference values corresponding to the two audio frames are obtained, to convert the plurality of difference values into a binary audio fingerprint, for each of the plurality of difference values, the server may determine whether the difference value is greater than the preset difference value threshold. When the difference value is greater than the preset difference value threshold, the server may assign a bit corresponding to the difference value in the audio fingerprint as 1. When the difference value is not greater than the preset difference value threshold, the server assigns a bit corresponding to the difference value in the audio fingerprint as 0. The preset difference value threshold may be determined according to an actual requirement, and may be 0. For example, assuming that an audio frame is divided into 32 sub-bands, a plurality of difference values corresponding to two chronologically adjacent audio frames is 10, −5, 9, 4, −2, . . . , 10, and the preset difference value threshold is 0, an audio fingerprint corresponding to the two audio frames is 1, 0, 1, 1, 0, . . . , 1, being 32 bits in total.

For example, assuming that 100 audio frames are acquired from the audio segment, and each audio frame is divided into 32 sub-bands, one audio fingerprint may be determined in every two chronologically adjacent audio frames in the 100 audio frames. 99 audio fingerprints are determined in the audio segment in total, and each audio fingerprint is a 32-bit binary digit.

In this embodiment of this application, spectral centroids of a plurality of sub-bands of each audio frame are computed, and an audio fingerprint is determined based on a difference value between spectral centroids of a sub-band corresponding to two chronologically adjacent audio frames. The method may be referred to as a normalized spectral sub-band centroid (NSSC) method. The following technical effect may be achieved:

First, a pseudo formant problem does not exist in such an audio fingerprint extraction method, improving accuracy of a retrieval process.

A formant refers to a region in which energy in a spectrum is relatively centralized, which is a common feature in voice signal processing. In the related art, a problem that two non-formants in a spectrum overlap to form a pseudo formant usually occurs in the audio fingerprint extraction method, causing a large quantity of mistakes to occur in audio fingerprints extracted based on the pseudo formant. In this embodiment of this application, spectral centroids of different sub-bands are independent of each other, and do not overlap to interfere with each other. Therefore, there is no pseudo formant problem, credibility of spectral centroids is high, and it is ensured that accuracy of the extracted audio fingerprints is high, thereby improving a recall rate and a precision rate in an audio file retrieval process.

Second, the audio fingerprint extraction method is applicable to a case of a small frame overlapping ratio, so that a computing amount can be greatly reduced.

In the related art, audio fingerprints extracted based on the Philips algorithm have an inherent defect of time domain misalignment. As a result, framing may be performed by using only a relatively large frame overlapping ratio, otherwise failure in fingerprint matching may be caused due to the time domain misalignment. The performing framing by using a relatively large frame overlapping ratio may cause an extremely large computing amount in the audio fingerprint extraction process. First, because the frame overlapping ratio is large, and a frame shift is small, when windowing processing is performed on audio segments with a same length, a smaller frame shift indicates a larger quantity of candidate audio frames obtained by dividing an audio segment, a larger quantity of times that FFT needs to be performed, and a larger computing amount. Second, extremely large computational complexity of FFT may be caused because of a large frame overlapping ratio. For example, when an audio sampling rate is 8 kHz, a frame length of one candidate audio frame is 2656 points; and when FFT is performed on the candidate audio frame, 0 needs to be added at the tail end of the candidate audio frame, to change the length to 4096 points. The computational complexity is extremely high.

In this embodiment of this application, there is no time domain misalignment in audio fingerprints extracted based on spectral centroids, so that a relatively small frame overlapping ratio may be used for performing framing, thereby greatly reducing a computing amount of extracting the audio fingerprints. First, because the frame overlapping ratio is small, and a frame shift is large, when windowing processing is performed on audio segments with a same length, a large frame shift indicates a smaller quantity of candidate audio frames obtained by dividing an audio segment, a smaller quantity of times that FFT needs to be performed, and a smaller computing amount. Therefore, time consumed by fingerprint extraction is reduced, and efficiency of fingerprint extraction is improved. Second, a small frame overlapping ratio may reduce the computational complexity of the FFT, thereby further reducing the computing amount, reducing time consumed by the fingerprint extraction, and improving efficiency of the fingerprint extraction.

208. The server retrieves, in an audio file library based on audio fingerprints of the plurality of audio frames, a target audio file matching the audio segment.

When obtaining the target audio file, the server may transmit the target audio file to the terminal, or may transmit file-related information of the target audio file to the terminal, for example, a file link and the name of the audio file, and a singer of the audio file. The server may further simultaneously transmit file-related information of the target audio file and the audio file to the terminal, so that a user on the terminal may perform playing and viewing according to a requirement of the user.

An audio file library includes a large quantity of audio files and a large quantity of corresponding audio fingerprints. After obtaining a plurality of audio fingerprints of the audio segment, the server may retrieve a target audio file matching the audio segment in the audio file library based on the plurality of audio fingerprints by: determining whether a plurality of audio fingerprints of each audio file in the audio file library hit the plurality of audio fingerprints of the audio segment.

A process of acquiring a target audio file matching the audio segment may specifically include the following step 1 to step 3:

Step 1. The server records a hit count of at least one designated audio file in the audio file library, where the designated audio file refers to an audio file hitting any audio fingerprint.

Taking an example in which an audio file in the audio file library that hits any audio fingerprint of the audio segment is referred to as a designated audio file, for any of the plurality of audio fingerprints of the audio segment, when an audio file in the audio file library hits the audio fingerprint, the audio file is the designated audio file. The server may record a quantity of times that the designated audio file hits the audio fingerprint, and may further record an audio library file number of the designated audio file in the audio file library, so that the designated audio file may be accessed subsequently based on the audio library file number. In addition, when retrieval is performed on the plurality of audio fingerprints, the server may accumulate a quantity of times that each designated audio file hits the plurality of audio fingerprints, and use an accumulation result as a hit count corresponding to the designated audio file.

Step 2. For each of the at least one designated audio file, the server computes a bit error rate of the designated audio file in a case that a hit count of the designated audio file is greater than a preset hit count threshold.

The server may acquire a preset hit count threshold in advance. For each designated audio file, the server may determine whether a hit count of the designated audio file is greater than the preset hit count threshold. When a hit count of the designated audio file is greater than the preset hit count threshold, it may be known that the designated audio file is similar to the audio segment, and a probability that the designated audio file is the target audio file is relatively large. Therefore, a bit error rate of the designated audio file is computed. When the hit count of the designated audio file is not greater than the preset hit count threshold, it may be known that the designated audio file is not similar to the audio segment, and a probability that the designated audio file is the target audio file is relatively small. Therefore, a bit error rate of the designated audio file does not need to be computed. The preset hit count threshold may be determined according to an actual requirement. An experiment indicates that, when the preset hit count threshold is 14, accuracy of the retrieval process is relatively high. Therefore, 14 may be used as the preset hit count threshold.

For a specific process of computing a bit error rate of the designated audio file, the server may acquire, from a start location of the designated audio file, a quantity of difference bits between a plurality of audio fingerprints of the audio segment and a plurality of audio fingerprints of the designated audio file, simultaneously acquire a total quantity of bits of the plurality of audio fingerprints of the audio segment, and compute a ratio of the quantity of difference bits to the total quantity of bits as a bit error rate of the designated audio file.

Step 3. The server selects the target audio file from the at least one designated audio file based on a bit error rate of each designated audio file.

Optionally, the server may determine whether a bit error rate of each designated audio file is greater than a preset bit error rate threshold. When a bit error rate of any designated audio file is greater than the preset bit error rate threshold, the designated audio file is used as the target audio file. The preset bit error rate threshold may be determined according to an actual requirement, and may be 0.35.

Through the foregoing step 1 to step 3, the following technical effect may be achieved.

In the related art, bit error rates of all audio files in the audio file library that hit audio fingerprints may be computed, which is time-consuming and has low retrieval efficiency. In this embodiment of this application, not all bit error rates of audio files in the audio file library that hit audio fingerprints need to be recorded, and a preset hit count threshold is set. When an audio file in the audio file library hits an audio fingerprint, the audio file is recorded as a designated audio file. Only when a hit count of the designated audio file is greater than the preset hit count threshold, a bit error rate of the designated audio file is computed. Therefore, a computing amount is relatively small, thereby improving a speed and efficiency of audio retrieval.

In this embodiment of this application, audio fingerprints of each audio file in the audio file library may be extracted in a manner similar to steps 201 to 207. That is, the audio file library may be established through the following process.

Step 1. For each of a plurality of audio frames of any audio file, the server acquires spectral centroids of a plurality of sub-bands of the audio frame based on a spectrum of the audio frame.

This step is similar to step 205. Details are not described herein.

Step 2. For every two chronologically adjacent audio frames in the plurality of audio frames, the server computes a difference value between spectral centroids of a sub-band corresponding to the two audio frames, to obtain a plurality of difference values.

This step is similar to step 206. Details are not described herein.

Step 3. The server obtains an audio fingerprint corresponding to the two audio frames based on the plurality of difference values and a preset difference value threshold, each bit of the audio fingerprint being determined by whether a difference value corresponding to the bit meets a preset difference value condition.

This step is similar to step 207. Details are not described herein.

Step 4. The server correspondingly stores at least one obtained audio fingerprint and the audio file in the audio file library.

Through the foregoing step 1 to step 4, audio fingerprints of each audio file in the audio file library are determined by spectral centroids of sub-bands, so that it can be ensured that accuracy of the audio fingerprints of each audio file is high. In addition, in a process of extracting audio fingerprints of each audio file, a small frame overlapping ratio may be used for performing framing on each audio file, thereby reducing a quantity of audio frames of each audio file. Therefore, a computing amount of extracting audio fingerprints of each audio file is reduced, thereby improving a speed of establishing the audio file library, and improving efficiency of establishing the audio file library.

Figure 6:
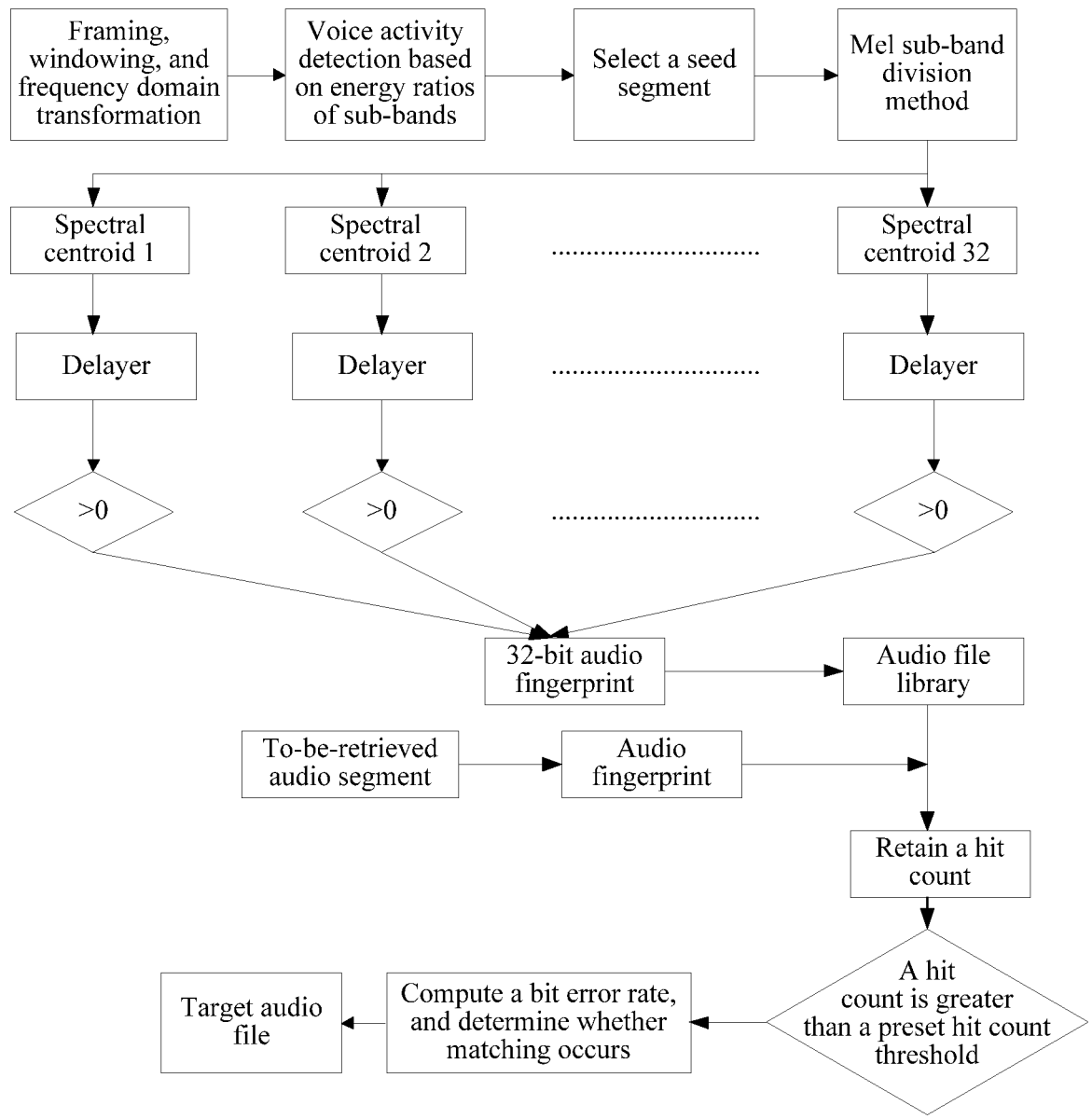
FIG. 6 is an operating flowchart of a method for retrieving an audio file according to an embodiment of this application.

In conclusion, FIG. 6 is an operating flowchart of an embodiment of this application. A processing logic of each step in the embodiments of this application may be encapsulated as an audio file retrieval system. In an actual application, only an audio segment needs to be input into the audio file retrieval system, and the audio file retrieval system may automatically perform the foregoing steps, and output the target audio file.

In the method provided in the embodiments of this application, audio fingerprints of an audio segment are extracted based on spectral centroids of a plurality of sub-bands of a plurality of audio frames in the audio segment, which may avoid a pseudo formant problem. Therefore, accuracy of the extracted audio fingerprints may be ensured, thereby ensuring accuracy of retrieving an audio file.

To intuitively show the technical effects of the embodiments of this application, the applicant respectively performs a comparative experiment by using the solutions provided in the related art and the solutions provided in the embodiments of this application. The experiment proves that in the method for retrieving an audio file provided in the embodiments of this application, the recall rate, the precision rate, and a noise immunity capability are improved, and retrieval efficiency and retrieval performance are obviously improved. In addition, a storage amount is reduced, and the retrieval efficiency is improved.

Using an example in which the method provided in the embodiments of this application is referred to as an NSSC method, the applicant combines 3 types of sub-band division manners, 3 types of window functions, 2 types of fingerprint extraction methods, and selects 7 groups of test conditions:

N1: Philips method, Hamming window, uniform sub-band division;

N2: Philips method, Hamming window, logarithmic sub-band division;

N3: Philips method, Hamming window, Mel sub-band division;

N4: Philips method, Blackman window, Mel sub-band division;

N5: Philips method, Hanning window, Mel sub-band division;

N6: NSSC method, Hanning window, logarithmic sub-band division; and

N7: NSSC method, Hanning window, Mel sub-band division.

The finally obtained recall rate and precision rate are shown in FIG. 6. In terms of the precision rate, N7 (fingerprint extraction through the NSSC method, Hanning window, Mel sub-band division) is the best, N5 is second-best, and N1 and N2 are poor. In terms of the recall rate, N5 (fingerprint extraction through the Philips method, Hanning window, Mel sub-band division) and N7 (fingerprint extraction through the NSSC method, Hanning window, Mel sub-band division) are the best.

Figure 7:
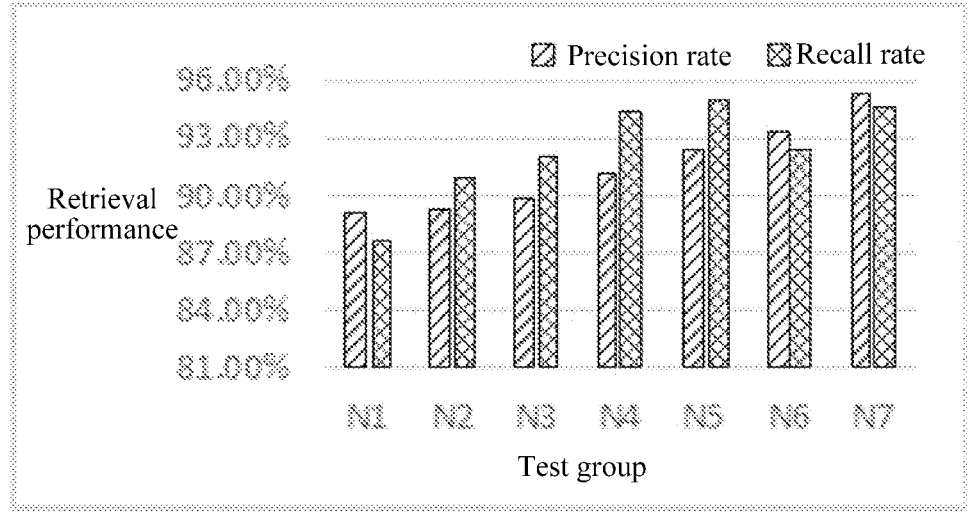
FIG. 7 is an experimental result comparison diagram of precision rates and recall rates at different signal-to-noise ratios in the related art and an embodiment of this application.

Using an example in which the method in the related art is referred to as a baseline method, the method provided in the embodiments of this application is referred to as an improvement method. Recall rates and precision rates of voice and music are tested in cases of different signal-to-noise ratios respectively by using the baseline method and the improvement method. A result is shown in FIG. 7. It can be known from the result that, with the decrease of the signal-to-noise ratio, the recall rate and the precision rate of the baseline method are abruptly decreased. The recall rate and the precision rate of the improvement method are decreased more slowly with the increase of the noise, and noise immunity performance is improved to some extents.

Figure 8:
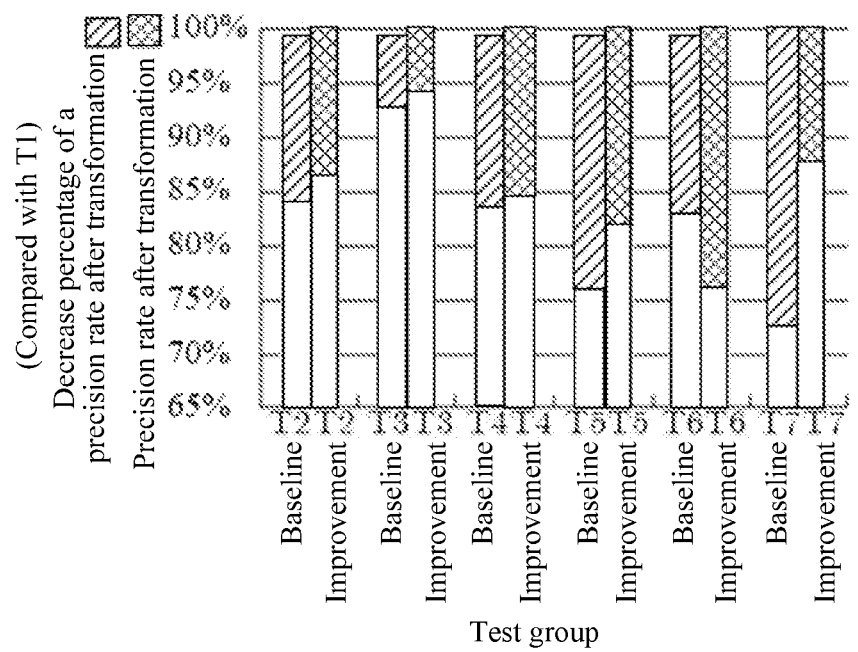
FIG. 8 is an experimental result comparison diagram of precision rates in different transformation in the related art and an embodiment of this application.
Figure 9:
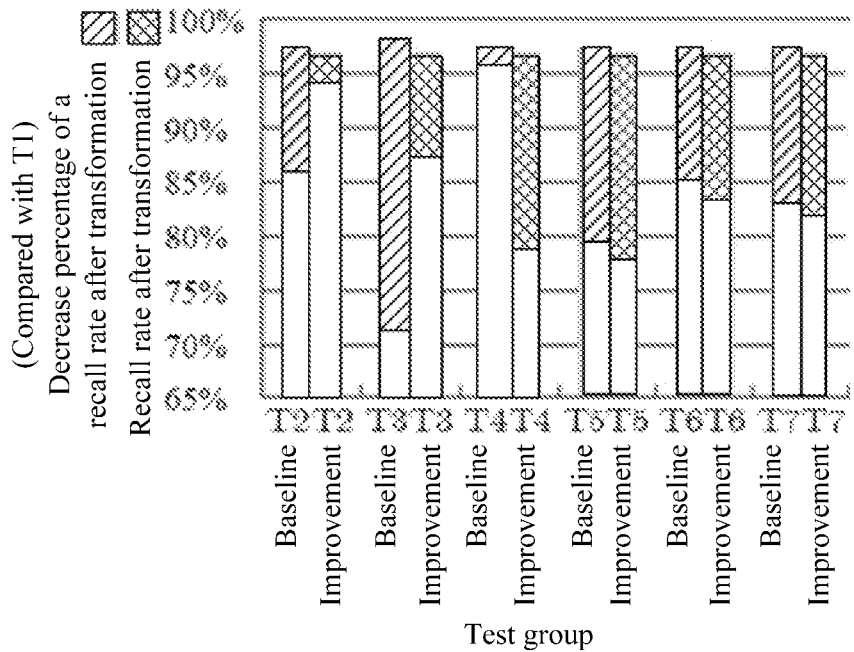
FIG. 9 is an experimental result comparison diagram of recall rates in different transformation in the related art and an embodiment of this application.

To further verify the improvement of robustness of the audio retrieval system, 5 types of transformation are performed on the audio segment in this specification, to form the following 7 groups of test sets:

T1: not processed (reference)
T2: dynamic equalization filtering
T3: noise addition processing (SNR=10 dB)
T4: pitch shifting processing
T5: speed shifting processing
T6: forced amplitude limiting processing
T7: echoing effect addition 7 groups of data are tested respectively by using the baseline method and the improvement method, and results are shown in FIG. 8 and FIG. 9. In terms of the precision rate, after transformation such as equalization filtering, noise addition, pitch shifting, speed shifting, or echo addition is performed on an audio segment, a decrease amplitude of the precision rate of the improvement method is much smaller than that of the baseline method. After amplitude limiting processing is performed, a decrease in the precision rate of the improvement method is relatively large because forced amplitude limiting may obviously affect the distribution of the spectral centroid. In terms of the recall rate, in the improvement method, audio after the equalization filtering and noise addition processing has quite good robustness, and the recall rate is substantially unchanged. In the baseline method, audio after the pitch shifting processing has quite good stability. For other transformed audio, decrease percentages of the recall rate in the two methods are close. In terms of the precision rate, N7 (fingerprint extraction through the NSSC method, Hanning window, Mel sub-band division) is the best, N5 is second-best, and N1 and N2 are poor. In terms of the recall rate, N5 (fingerprint extraction through the Philips method, Hanning window, Mel sub-band division) and N7 (fingerprint extraction through the NSSC method, Hanning window, Mel sub-band division) are the best.

In terms of whole performance, data (a size of a test set is 515 pieces) is tested by using the two methods, and a whole performance result is shown in table 1. It can be obviously seen from table 1 that, time consumed by retrieval in the improvement method is obviously decreased. In particular, fingerprint computing time is greatly reduced. In terms of accuracy, the recall rate of the improvement method is increased by 4.7%, and the precision rate has only a difference of 0.6% with that of the baseline method. Overall performance is improved.

TABLE 1

| Test condition | Precision rate | Recall rate | Audio fingerprint extraction duration | Retrieval duration |
|---|---|---|---|---|
| Baseline method | 99.2% | 91.9% | 205.1 s | 0.139 s |
| Improvement method | 99.8% | 96.6% | 39.4 s | 0.417 s |

Figure 10:
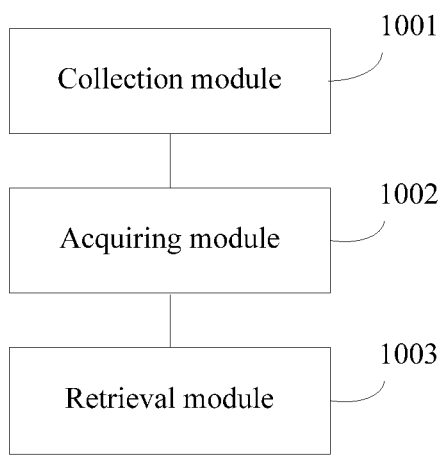
FIG. 10 is a schematic structural diagram of an apparatus for retrieving an audio file according to an embodiment of this application.

FIG. 10 is a schematic structural diagram of an apparatus for retrieving an audio file according to an embodiment of this application. Referring to FIG. 10, the apparatus includes: a collection module 1001, an acquiring module 1002, and a retrieval module 1003.

The collection module 1001 is configured to collect a to-be-retrieved audio segment in real time.

The acquiring module 1002 is configured to, for every two chronologically adjacent audio frames, acquire a difference value between spectral centroids of a sub-band corresponding to the two audio frames in a plurality of audio frames of the audio segment, to obtain a plurality of difference values.

The acquiring module 1002 is further configured to obtain an audio fingerprint corresponding to the two audio frames based on the plurality of difference values and a preset difference value threshold, each bit of the audio fingerprint being determined by whether a difference value corresponding to the bit meets a preset difference value condition.

The retrieval module 1003 is configured to perform retrieval in an audio file library based on audio fingerprints of the plurality of audio frames, to obtain a target audio file matching the audio segment.

Optionally, the acquiring module 1002 includes:

an acquiring submodule, configured to: for each sub-band of each audio frame in the audio segment, acquire an original spectral centroid of the sub-band based on an amplitude of each frequency in a spectrum of the sub-band of the audio frame; and a normalization submodule, configured to perform normalization on the original spectral centroid based on a lower limit frequency and an upper limit frequency of the sub-band, to obtain a spectral centroid of the sub-band.

Optionally, the acquiring module 1002 is further configured to acquire at least one energy peak in the audio segment.

The apparatus further includes:

a selection module, configured to select at least one seed segment from the audio segment based on the at least one energy peak, where each seed segment refers to at least one audio frame located in a preset quantity of frames around an energy peak; and a division module, configured to: for each audio frame in each of the at least one seed segment, divide a spectrum of the audio frame, to obtain a plurality of sub-bands corresponding to the audio frame.

Optionally, the acquiring module 1002 is further configured to: for each of a plurality of candidate audio frames of the audio segment, acquire an energy zero-crossing rate of the candidate audio frame based on a spectrum of the candidate audio frame.

The acquiring module 1002 is further configured to acquire energy ratios of a plurality of sub-bands of the candidate audio frame based on the spectrum of the candidate audio frame.

The apparatus further includes: a screening module, configured to obtain, through screening, a plurality of audio frames that do not meet a preset energy condition from the plurality of candidate audio frames based on the energy zero-crossing rate and a plurality of energy ratios of the candidate audio frame.

The preset energy condition is that the energy zero-crossing rate is lower than a preset zero-crossing rate threshold, and similarities between the energy ratios of the plurality of sub-bands meet a requirement.

Optionally, the acquiring module 1002 includes:

a recording submodule, configured to record a hit count of at least one designated audio file in the audio file library, where the designated audio file refers to an audio file hitting any audio fingerprint;

a computing submodule, configured to: for each of the at least one designated audio file, compute a bit error rate of the designated audio file in a case that a hit count of the designated audio file is greater than a preset hit count threshold; and a selection submodule, configured to select the target audio file from the at least one designated audio file based on a bit error rate of each designated audio file.

Optionally, the acquiring module 1002 is further configured to: for each of the plurality of difference values, assign a bit corresponding to the difference value in the audio fingerprint as 1 in a case that the difference value is greater than the preset difference value threshold; and assign a bit corresponding to the difference value in the audio fingerprint as 0 in a case that the difference value is not greater than the preset difference value threshold.

Optionally, the audio file library is established through the following process:

for each of a plurality of audio frames of any audio file, acquiring spectral centroids of a plurality of sub-bands of the audio frame based on a spectrum of the audio frame;

for every two chronologically adjacent audio frames in the plurality of audio frames, computing a difference value between spectral centroids of a sub-band corresponding to the two audio frames, to obtain a plurality of difference values;

obtaining an audio fingerprint corresponding to the two audio frames based on the plurality of difference values and a preset difference value threshold, each bit of the audio fingerprint being determined by whether a difference value corresponding to the bit meets a preset difference value condition; and correspondingly storing at least one obtained audio fingerprint and the audio file in the audio file library.

Any combination of the foregoing optional technical solutions may be used for forming an optional embodiment of the present disclosure. Details are not described herein.

When the apparatus for retrieving an audio file provided in the foregoing embodiment retrieves an audio file, it is illustrated with an example of division of the foregoing functional modules. In practical application, the foregoing functions may be distributed to different functional modules according to requirements, that is, the internal structure of the server is divided into different functional modules, so as to finish all or part of the functions described above. In addition, the apparatus for retrieving an audio file provided in the foregoing embodiments and the method embodiments for retrieving an audio file fall within a same conception. For details of a specific implementation process, refer to the method embodiments. Details are not described herein.

Figure 11:
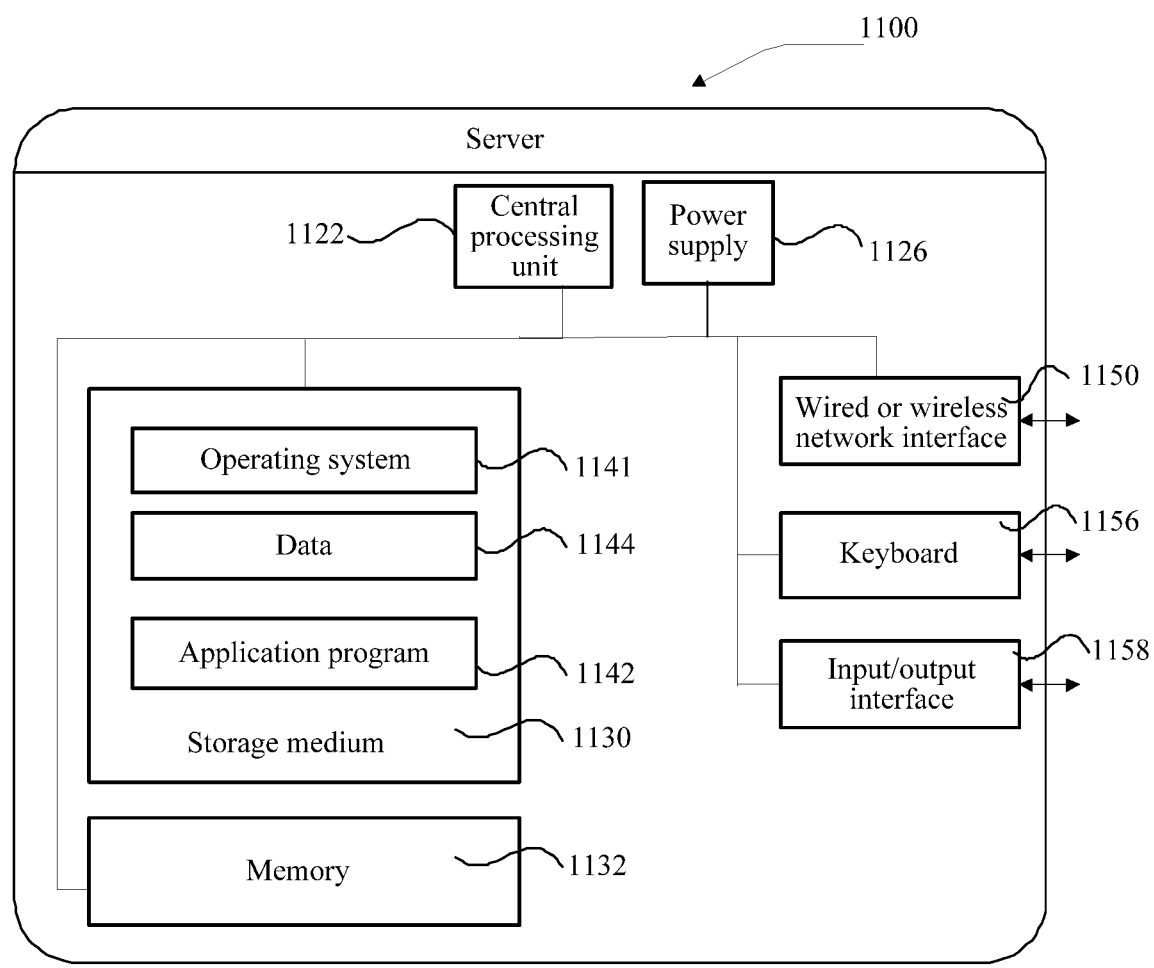
FIG. 11 is a schematic structural diagram of a server according to an embodiment of this application.

FIG. 11 is a schematic structural diagram of a server according to an embodiment of this application. The server 1100 may vary greatly due to different configurations or performance, and may include one or more central processing units (CPU) 1122 (for example, one or more processors) and a memory 1132, and one or more storage mediums 1130 (for example, one or more mass storage devices) that store an application program 1142 or data 1144. The memories 1132 and the storage mediums 1130 may be used for transient storage or permanent storage. The program stored in the storage mediums 1130 may include one or more modules (not shown), and each module may include a series of instructions for the server. Still further, the CPUs 1122 may be configured to communicate with the storage mediums 1130, and perform, on the server 1100, operations instructed by the series of instructions in the storage mediums 1130.

The server 1100 may further include one or more power supplies 1126, one or more wired or wireless network interfaces 1150, one or more input/output interfaces 1158, one or more keyboards 1156, and/or one or more operating systems 1141, for example, Windows Server™, Mac OS X™, Unix™, Linux™, and FreeBSD™.

Specifically, the instructions are loaded and executed by a processor of the server 1100 to implement the following method:

collecting a to-be-retrieved audio segment in real time; every two chronologically adjacent audio frames, acquiring a difference value between spectral centroids of a sub-band corresponding to the two audio frames in a plurality of audio frames of the audio segment, to obtain a plurality of difference values; obtaining an audio fingerprint corresponding to the two audio frames based on the plurality of difference values and a preset difference value threshold, each bit of the audio fingerprint being determined by whether a difference value corresponding to the bit meets a preset difference value condition; and performing retrieval in an audio file library based on audio fingerprints of the plurality of audio frames, to obtain a target audio file matching the audio segment.

In a possible implementation, the processor is configured to: for each sub-band of each audio frame in the audio segment, acquire an original spectral centroid of the sub-band based on an amplitude of each frequency in a spectrum of the sub-band of the audio frame; and perform normalization on the original spectral centroid based on a lower limit frequency and an upper limit frequency of the sub-band, to obtain a spectral centroid of the sub-band.

In a possible implementation, before the acquiring a difference value between spectral centroids of a sub-band corresponding to the two audio frames in a plurality of audio frames of the audio segment, to obtain a plurality of difference values, the method further includes:

acquiring at least one energy peak in the audio segment; selecting at least one seed segment from the audio segment based on the at least one energy peak, where each seed segment refers to at least one audio frame located in a preset quantity of frames around an energy peak; and for each audio frame in each of the at least one seed segment, dividing a spectrum of the audio frame, to obtain a plurality of sub-bands corresponding to the audio frame.

In a possible implementation, before the acquiring a difference value between spectral centroids of sub-bands corresponding to the two audio frames in a plurality of audio frames of the audio segment, to obtain a plurality of difference values, the method further includes:

for each of a plurality of candidate audio frames of the audio segment, acquiring an energy zero-crossing rate of the candidate audio frame based on a spectrum of the candidate audio frame;

acquiring energy ratios of a plurality of sub-bands of the candidate audio frame based on the spectrum of the candidate audio frame; and obtaining, through screening, a plurality of audio frames that do not meet a preset energy condition from the plurality of candidate audio frames based on the energy zero-crossing rate and a plurality of energy ratios of the candidate audio frame.

The preset energy condition is that the energy zero-crossing rate is lower than a preset zero-crossing rate threshold, and similarities between the energy ratios of the plurality of sub-bands meet a requirement.

In a possible implementation, the performing retrieval in an audio file library based on audio fingerprints of the plurality of audio frames, to obtain a target audio file matching the audio segment includes:

recording a hit count of at least one designated audio file in the audio file library, where the designated audio file refers to an audio file hitting any audio fingerprint;

for each of the at least one designated audio file, computing a bit error rate of the designated audio file in a case that a hit count of the designated audio file is greater than a preset hit count threshold; and selecting the target audio file from the at least one designated audio file based on a bit error rate of each designated audio file.

In a possible implementation, the obtaining an audio fingerprint corresponding to the two audio frames based on the plurality of difference values and a preset difference value threshold includes:

for each of the plurality of difference values, assigning a bit corresponding to the difference value in the audio fingerprint as 1 in a case that the difference value is greater than the preset difference value threshold; and assigning a bit corresponding to the difference value in the audio fingerprint as 0 in a case that the difference value is not greater than the preset difference value threshold.

In a possible implementation, the audio file library is established through the following process:

for each of a plurality of audio frames of any audio file, acquiring spectrum centroids of a plurality of sub-bands of the audio frame based on spectrum of the audio frame;

for every two chronologically adjacent audio frames in the plurality of audio frames, computing a difference value between spectrum centroids of a sub-band corresponding to the two audio frames, to obtain a plurality of difference values;

obtaining an audio fingerprint corresponding to the two audio frames based on the plurality of difference values and a preset difference value threshold, each bit of the audio fingerprint being determined by whether a difference value corresponding to the bit meets a preset difference value condition; and correspondingly storing at least one obtained audio fingerprint and the audio file in the audio file library.

In an exemplary embodiment, a computer-readable storage medium storing a computer program is further provided, for example, a memory storing a computer program. The computer program, when executed by a processor, implements the method for retrieving an audio file in the foregoing embodiments. For example, the computer-readable storage medium may be a read-only memory (ROM), a random access memory (RAM), a compact disc read-only memory (CD-ROM), a magnetic tape, a floppy disk, an optical data storage device, or the like.

Persons of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a read-only memory, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method for retrieving an audio file, comprising:
collecting, by a server, an audio segment in real time;
for every two chronologically adjacent audio frames in a plurality of audio frames of the audio segment,
acquiring, by the server, a difference value between spectral centroids of a sub-band corresponding to the two audio frames, to obtain a plurality of difference values, a quantity of the plurality of difference values equaling a quantity of sub-bands of one of the two audio frames; and
obtaining, by the server, an audio fingerprint corresponding to the two audio frames based on the plurality of difference values, each bit of the audio fingerprint being determined based on a comparison between a difference value corresponding to the bit and a preset difference value threshold;
retrieving, by the server, in an audio file library based on audio fingerprints of the plurality of audio frames, candidate audio files matching the audio segment;
recording a hit count of at least one designated audio file in the audio file library, wherein the designated audio file refers to one of the candidate audio files hitting any of the audio fingerprints, and the hit count indicates a quantity of audio fingerprints that one designated audio file hits;
for each of the at least one designated audio file, computing a bit error rate of the designated audio file when the hit count of the designated audio file is greater than a preset hit count threshold, wherein the bit error rate indicates a ratio of a quantity of difference bits between the audio fingerprints of the audio segment and the audio fingerprints hit by the designated audio file and a total quantity of bits of the audio fingerprints of the audio segment; and
selecting a target audio file from the at least one designated audio file based on the bit error rate of each designated audio file.

2. The method according to claim 1, further comprising:
for each sub-band of each audio frame in the audio segment,
acquiring, by the server, an original spectral centroid of the sub-band based on an amplitude of each frequency in a spectrum of the sub-band of the audio frame; and performing, by the server, normalization on the original spectral centroid based on a lower limit frequency and an upper limit frequency of the sub-band, to obtain a spectral centroid of the sub-band of the audio frame.

3. The method according to claim 1, further comprising:
acquiring, by the server, at least one energy peak in the audio segment;
selecting, by the server, at least one seed segment from the audio segment based on the at least one energy peak, wherein each seed segment refers to at least one audio frame located in a preset quantity of frames around an energy peak; and
for each audio frame in each of the at least one seed segment, dividing, by the server, a spectrum of the audio frame, to obtain a plurality of sub-bands corresponding to the audio frame.

4. The method according to claim 1, further comprising:
for each of a plurality of candidate audio frames in the audio segment,
  acquiring, by the server, an energy zero-crossing rate of the candidate audio frame based on a spectrum of the candidate audio frame; and
  acquiring, by the server, energy ratios of a plurality of sub-bands of the candidate audio frame based on the spectrum of the candidate audio frame;
determining, by the server through screening, audio frames that do not meet a preset energy condition as audio frames of a voice portion of the audio segment based on the energy zero-crossing rate and the energy ratios of each candidate audio frame; and
obtaining the plurality of audio frames of the audio segment from the audio frames of the voice portion of the audio segment, wherein
the preset energy condition includes that the energy zero-crossing rate is lower than a preset zero-crossing rate threshold, and similarities between the energy ratios of the plurality of sub-bands meet a requirement.

5. The method according to claim 1, wherein obtaining the audio fingerprint corresponding to the two audio frames comprises:
for each of the plurality of difference values, assigning, by the server, a bit corresponding to the difference value in the audio fingerprint as 1 when the difference value is greater than the preset difference value threshold; and
assigning, by the server, a bit corresponding to the difference value in the audio fingerprint as 0 when the difference value is not greater than the preset difference value threshold.

6. The method according to claim 1, further comprising:
establishing the audio file library by:
for each of a plurality of audio frames in any audio file,
  acquiring, by the server, spectral centroids of a plurality of sub-bands of the audio frame based on a spectrum of the audio frame;
for every two chronologically adjacent audio frames in the plurality of audio frames in one audio file,
  computing, by the server, a difference value between spectral centroids of a sub-band corresponding to the two audio frames, to obtain a plurality of difference values; and
  obtaining, by the server, an audio fingerprint corresponding to the two audio frames based on the plurality of difference values and the preset difference value threshold, each bit of the audio fingerprint being determined by whether a difference value corresponding to the bit meets a preset difference value condition; and correspondingly storing, by the server, at least one obtained audio fingerprint and the one audio file in the audio file library.

7. A server, comprising a processor and a memory, the processor being configured to:
collect an audio segment in real time;
for every two chronologically adjacent audio frames in a plurality of audio frames of the audio segment,
acquire a difference value between spectral centroids of sub-bands corresponding to every two chronologically adjacent audio frames in a plurality of audio frames of the audio segment, to obtain a plurality of difference values; and
obtain an audio fingerprint corresponding to the two audio frames based on the plurality of difference values, each bit of the audio fingerprint being determined based on a comparison between a difference value corresponding to the bit and a preset difference value threshold;
retrieve, in an audio file library based on audio fingerprints of the plurality of audio frames, candidate audio files matching the audio segment;
record a hit count of at least one designated audio file in the audio file library, wherein the designated audio file refers to one of the candidate audio files hitting any of the audio fingerprints, and the hit count indicates a quantity of audio fingerprints that one designated audio file hits;
for each of the at least one designated audio file, compute a bit error rate of the designated audio file when the hit count of the designated audio file is greater than a preset hit count threshold, wherein the bit error rate indicates a ratio of a quantity of difference bits between the audio fingerprints of the audio segment and the audio fingerprints hit by the designated audio file and a total quantity of bits of the audio fingerprints of the audio segment; and
select a target audio file from the at least one designated audio file based on the bit error rate of each designated audio file.

8. The server according to claim 7, wherein the processor is further configured to: for each sub-band of each audio frame in the audio segment,
acquire an original spectral centroid of the sub-band based on an amplitude of each frequency in a spectrum of the sub-band of the audio frame; and
perform normalization on the original spectral centroid based on a lower limit frequency and an upper limit frequency of the sub-band, to obtain a spectral centroid of the sub-band of the audio frame.

9. The server according to claim 7, wherein the processor is further configured to:
acquire at least one energy peak in the audio segment;
select at least one seed segment from the audio segment based on the at least one energy peak, wherein each seed segment refers to at least one audio frame located in a preset quantity of frames around an energy peak; and
for each audio frame in each of the at least one seed segment, dividing a spectrum of the audio frame, to obtain a plurality of sub-bands corresponding to the audio frame.

10. The server according to claim 7, wherein the processor is further configured to:
for each of a plurality of candidate audio frames in the audio segment, acquire an energy zero-crossing rate of the candidate audio frame based on a spectrum of the candidate audio frame; and acquire energy ratios of a plurality of sub-bands of the candidate audio frame based on a spectrum of the candidate audio frame;

determine audio frames that do not meet a preset energy condition as audio frames of a voice portion of the audio segment based on the energy zero-crossing rate and the energy ratios of each candidate audio frame; and obtain the plurality of audio frames of the audio segment from the audio frames of the voice portion of the audio segment, wherein the preset energy condition includes that the energy zero-crossing rate is lower than a preset zero-crossing rate threshold, and similarities between the energy ratios of the plurality of sub-bands meet a requirement.

11. The server according to claim 7, wherein obtaining the audio fingerprint corresponding to the two audio frames comprises:

for each of the plurality of difference values, assigning a bit corresponding to the difference value in the audio fingerprint as 1 when the difference value is greater than the preset difference value threshold; and assigning a bit corresponding to the difference value in the audio fingerprint as 0 when the difference value is not greater than the preset difference value threshold.

12. The server according to claim 7, wherein the processor is further configured to establish the audio file library by:

for each of a plurality of audio frames in any audio file, acquiring spectral centroids of a plurality of sub-bands of the audio frame based on a spectrum of the audio frame;

for every two chronologically adjacent audio frames in the plurality of audio frames in one audio file, computing a difference value between spectral centroids of a sub-band corresponding to the two audio frames, to obtain a plurality of difference values; and obtaining an audio fingerprint corresponding to the two audio frames based on the plurality of difference values and the preset difference value threshold, each bit of the audio fingerprint being determined by whether a difference value corresponding to the bit meets a preset difference value condition; and correspondingly storing at least one obtained audio fingerprint and the audio file in the one audio file library.

13. A non-transitory computer-readable storage medium, the storage medium storing at least one instruction, and the instruction being loaded and executed by a processor to implement:

collecting an audio segment in real time;

for every two chronologically adjacent audio frames in a plurality of audio frames of the audio segment, acquiring a difference value between spectral centroids of a sub-band corresponding to the two audio frames, to obtain a plurality of difference values, a quantity of the plurality of difference values equaling a quantity of sub-bands of one of the two audio frames; and obtaining an audio fingerprint corresponding to the two audio frames based on the plurality of difference values, each bit of the audio fingerprint being determined based on a comparison between a difference value corresponding to the bit and a preset difference value threshold;

retrieving in an audio file library based on audio fingerprints of the plurality of audio frames, candidate audio files matching the audio segment;

recording a hit count of at least one designated audio file in the audio file library, wherein the designated audio file refers to one of the candidate audio files hitting any of the audio fingerprints, and the hit count indicates a quantity of audio fingerprints that one designated audio file hits;

for each of the at least one designated audio file, computing a bit error rate of the designated audio file when the hit count of the designated audio file is greater than a preset hit count threshold, wherein the bit error rate indicates a ratio of a quantity of difference bits between the audio fingerprints of the audio segment and the audio fingerprints hit by the designated audio file and a total quantity of bits of the audio fingerprints of the audio segment; and selecting a target audio file from the at least one designated audio file based on the bit error rate of each designated audio file.

14. The storage medium according to claim 13, wherein the instruction further cause the processor to perform: for each sub-band of each audio frame in the audio segment, acquiring an original spectral centroid of the sub-band based on an amplitude of each frequency in a spectrum of the sub-band of the audio frame; and performing normalization on the original spectral centroid based on a lower limit frequency and an upper limit frequency of the sub-band, to obtain a spectral centroid of the sub-band of the audio frame.

15. The storage medium according to claim 13, wherein the instruction further cause the processor to perform:

acquiring at least one energy peak in the audio segment;

selecting at least one seed segment from the audio segment based on the at least one energy peak, wherein each seed segment refers to at least one audio frame located in a preset quantity of frames around an energy peak; and for each audio frame in each of the at least one seed segment, dividing a spectrum of the audio frame, to obtain a plurality of sub-bands corresponding to the audio frame.

16. The storage medium according to claim 13, wherein the instruction further cause the processor to perform:

for each of a plurality of candidate audio frames in the audio segment, acquiring an energy zero-crossing rate of the candidate audio frame based on a spectrum of the candidate audio frame; and acquiring energy ratios of a plurality of sub-bands of the candidate audio frame based on the spectrum of the candidate audio frame;

determining audio frames that do not meet a preset energy condition as audio frames of a voice portion of the audio segment based on the energy zero-crossing rate and the energy ratios of each candidate audio frame; and obtaining the plurality of audio frames of the audio segment from the audio frames of the voice portion of the audio segment, wherein the preset energy condition includes that the energy zero-crossing rate is lower than a preset zero-crossing rate threshold, and similarities between the energy ratios of the plurality of sub-bands meet a requirement.

17. The storage medium according to claim 13, wherein obtaining the audio fingerprint corresponding to the two audio frames comprises:
- for each of the plurality of difference values, assigning a bit corresponding to the difference value in the audio fingerprint as 1 when the difference value is greater than the preset difference value threshold; and
- assigning a bit corresponding to the difference value in the audio fingerprint as 0 when the difference value is not greater than the preset difference value threshold.

18. The method according to claim 1, wherein selecting the target audio file from the at least one designated audio file based on the bit error rate of each designated audio file comprises:
- determine whether the bit error rate of each designated audio file is greater than a preset bit error rate threshold; and
- using at least one designated audio file whose bit error rate is greater than the preset bit error rate threshold as the target audio file.

* * * * *